US008543090B2

(12) United States Patent
Yasuda (10) Patent No.: US 8,543,090 B2
(45) Date of Patent: Sep. 24, 2013

(54) MOBILE TERMINAL

(75) Inventor: Tomoaki Yasuda, Shijonawate (JP)

(73) Assignee: Kyocera Corporation, Kyoto (JP)

( * ) Notice: Subject to any disclaimer, the term of this patent is extended or adjusted under 35 U.S.C. 154(b) by 1305 days.

(21) Appl. No.: 12/059,204

(22) Filed: Mar. 31, 2008

(65) Prior Publication Data

US 2008/0242266 A1 Oct. 2, 2008

(30) Foreign Application Priority Data

Mar. 30, 2007 (JP) ................................ 2007-092156

(51) Int. Cl.
*H04M 1/66* (2006.01)
(52) U.S. Cl.
USPC ............ 455/411; 455/410; 713/184; 713/168
(58) Field of Classification Search
USPC ... 455/411, 456.6, 432.3, 456.3; 365/185.13, 365/189.05; 257/E21.69; 315/101; 369/77.21; 713/182, 184, 168
See application file for complete search history.

(56) References Cited

U.S. PATENT DOCUMENTS

| | | | | |
|---|---|---|---|---|
| 6,411,807 | B1 * | 6/2002 | Amin et al. | 455/432.3 |
| 8,301,897 | B2 * | 10/2012 | Turner | 713/182 |
| 2002/0055361 | A1 * | 5/2002 | McDonnell et al. | 455/456 |
| 2003/0073448 | A1 * | 4/2003 | Ozeki et al. | 455/456 |
| 2004/0097217 | A1 * | 5/2004 | McClain | 455/411 |
| 2006/0041759 | A1 * | 2/2006 | Kaliski et al. | 713/184 |
| 2008/0281737 | A1 * | 11/2008 | Fajardo | 705/35 |

FOREIGN PATENT DOCUMENTS

| | | |
|---|---|---|
| JP | 09-182154 | 7/1997 |
| JP | 2002-183705 | 6/2002 |
| JP | 2002-300651 | 10/2002 |
| JP | 2006-109326 | 4/2006 |
| JP | 2007-018050 | 1/2007 |
| JP | 2007-040008 A | 2/2007 |

OTHER PUBLICATIONS

Office Action from Japanese Patent Application No. 2007-092156, mailed on Mar. 1, 2011.
Japanese Office Action, Patent Application No. 2007-092166, mailed on Aug. 30, 2011 and English translation.

* cited by examiner

*Primary Examiner* — Mahendra Patel
(74) *Attorney, Agent, or Firm* — Duane Morris LLP (57) ABSTRACT

A mobile terminal includes a processor shifting a state between a first restricted state for restricting a key operation except for at least a code inputting operation, a second restricted state for restricting a key operation including at least said code inputting operation, and a unrestricted state for making a key operation unrestricted. The processor selects the unrestricted state when a code input by the code inputting operation in the first restricted state is a preset code. Furthermore, whether or not the number of executions of the code inputting operation in the first restricted state is above a threshold value is repetitively determined, and if the determination result is negative, the first restricted state is selected while if the determination result is affirmative, the second restricted state is selected. Then, a possibility of a key operator being a qualified person is repetitively determined, and as the possibility is high, the threshold value is made large.

12 Claims, 6 Drawing Sheets

MOBILE TERMINAL

CROSS REFERENCE OF RELATED APPLICATION

The disclosure of Japanese Patent Application No. 2007-92156 is incorporated herein by reference.

BACKGROUND OF THE INVENTION

1. Field of the Invention

The present invention relates to a mobile terminal. More specifically, the present invention relates to a mobile terminal utilized in a cellular phone terminal, and shifting a state between an unrestricted state in which a key operation is not restricted and a restricted state in which a key operation is restricted.

2. Description of the Related Art

A restricted state in which a key operation is restricted can generally cancelled by inputting a PIN (Personal Identity Number) code. Specifically, the mobile terminal is stored with a PIN code (preset PIN code) of an owner (qualified person). When a PIN code input by a key operator matches with a preset PIN code, the restricted state is canceled. That is, the restricted state here is a partial restricted state in which a key operation other than a PIN code inputting operation is restricted.

On the other hand, for the purpose of preventing cancellation of the restricted state by a finder, etc. (unqualified person), execution of continuous PIN code inputting operations is normally restricted so as to be below a preset number of times. Even after the number of continuous executions reaches the preset number of times, when the codes do not match with each other, all the key operations including a PIN code inputting operation is restricted. As a result of the PIN code inputting operation by the unqualified person, when an entire-restricted state in which all the key operations are restricted prevails, even if the mobile terminal is returned to the owner (qualified person) thereafter, the owner can no longer use the mobile terminal.

SUMMARY OF THE INVENTION

A mobile terminal according to the present invention is a mobile terminal shifting a state between a first restricted state for restricting a key operation and an unrestricted state for making a key operation unrestricted comprises: a first selector for selecting the unrestricted state when a code input by the code inputting operation in a first restricted state for restricting a key operation except for at least a code inputting operation is a preset code; a second selector for repetitively determining whether or not the number of executions of the code inputting operation in the first restricted state is above a threshold value, selecting the first restricted state when it is determined that the number of executions is not above the threshold values, and selecting a second restricted state for restricting a key operation including at least the code inputting operation when it is determined that the number of executions is above the threshold value; and a threshold changer for repetitively determining a possibility of a key operator being a qualified person, and making the threshold value larger as the possibility is high.

A mobile terminal shifts a state between a first restricted state for restricting a key operation except for at least a code inputting operation, a second restricted state for restricting a key operation including at least the code inputting operation, and a unrestricted state for making a key operation unrestricted. In the mobile terminal, when a code input by the code inputting operation in the first restricted state is a preset code, a first selector selects the unrestricted state. A second selector repetitively determines whether or not the number of executions of the code inputting operation in the first restricted state is above a threshold value and selects the first restricted state if the determination result is negative, that is, if the number of executions is not above the threshold value, and selects the second restricted state if the determination result is affirmative, that is, when the number of executions is above the threshold value. A threshold changer repetitively determines a possibility of a key operator being a qualified person, and makes the threshold value large as the possibility is high.

Thus, when the number of executions of the code inputting operation is above the threshold value, the second restricted state is established, and therefore, a code inputting operation is allowed by the number corresponding to the threshold value. Here, the threshold value is made larger as the possibility of the key operator being a qualified person is high, and is made smaller the possibility of the key operator being an unqualified person is high. When the threshold value is made larger to make the number of executions of the code inputting operation smaller than the threshold value, the first restricted state is established. Thus, when the key operator changes from the unqualified person to the qualified person, a further code inputting operation can be allowed by the number corresponding to the difference of the threshold values.

Objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
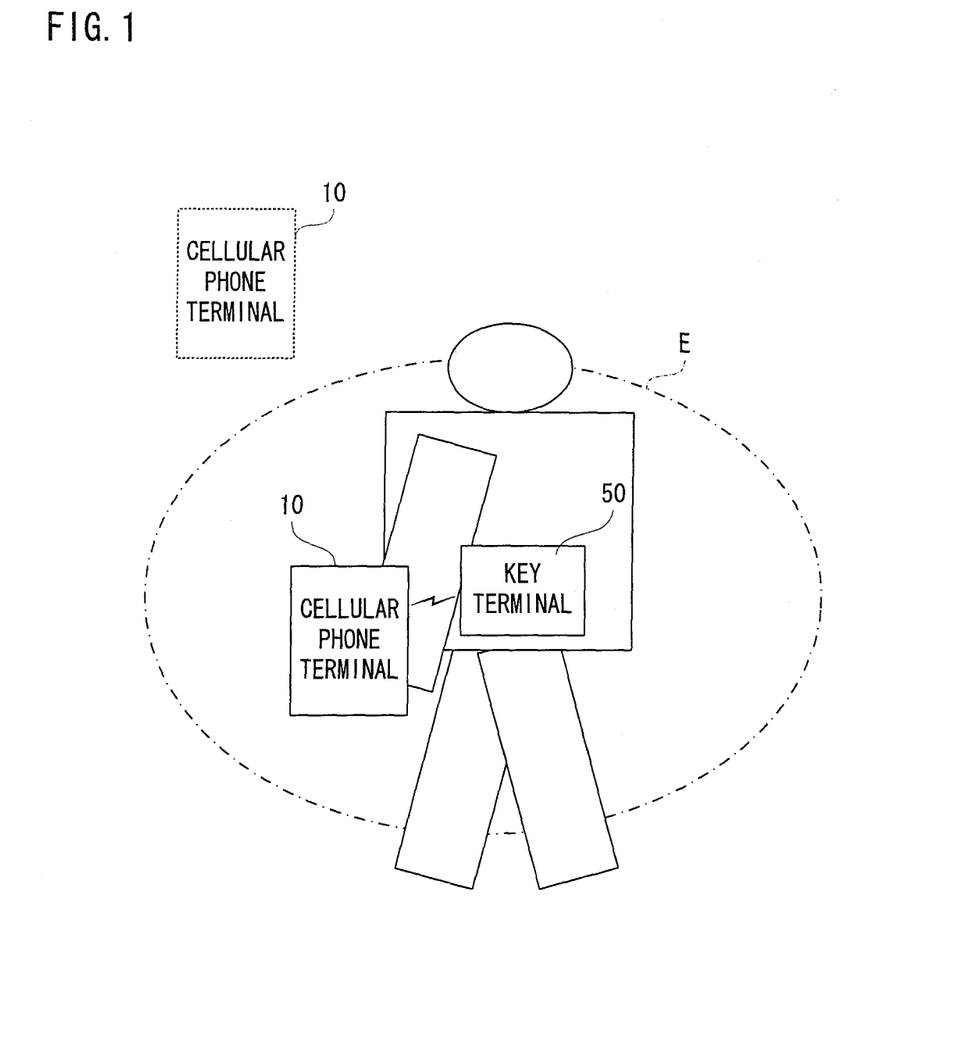
FIG. 1 is a block diagram showing one embodiment of the present invention.

Referring to FIG. 1, a cellular phone terminal 10 in this embodiment has a short distance radio communication function, and restricts a key operation by an unqualified person in cooperation with a key terminal 50 such as a finder similarly having a short distance radio communication function. It should be noted the key operation in this embodiment does not include an operation of turning on and off a power source.

Figure 3:
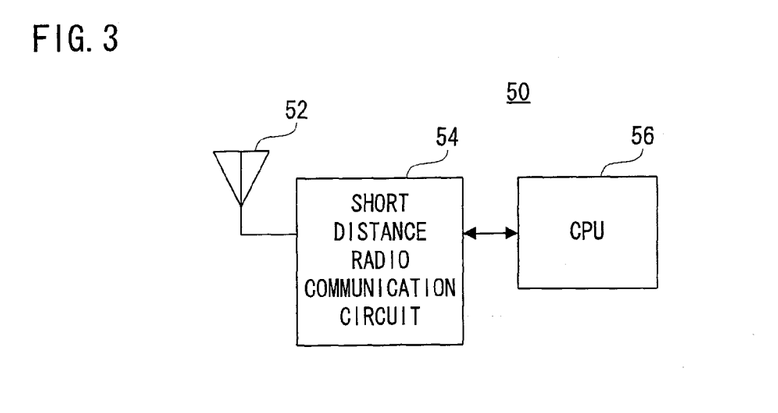
FIG. 3 is a block diagram showing a configuration of a key terminal applied to FIG. 1 embodiment.

Each of the cellular phone terminal 10 and the key terminal 50 is normally held by a qualified person such as an owner, etc., and performs a short distance radio communication with each other at intervals of a few seconds. Specifically, the cellular phone terminal 10 includes a short distance radio communication circuit 28 and an antenna for short distance radio communication 30. The key terminal 50 includes a short distance radio communication circuit 54 and an antenna for short distance radio communication 52 as shown in FIG. 3.

When a short distance radio communication is performed, one of the cellular phone terminal 10 and the key terminal 50 functions as a host (key terminal 50 here) to poll the other of the cellular phone terminal 10 and the key terminal 50 (cellular phone terminal 10 here). That is, a CPU 56 of the key terminal 50 generates a polling signal at intervals of a few seconds, and sends the generated polling signal through the short distance radio communication circuit 54 and the antenna 52. A CPU 26 of the cellular phone terminal 10 receives the sent polling signal through the antenna 30 and the short distance radio communication circuit 28, and sends back an answer signal. Accordingly, a range of access of the polling signal and the answer signal is a short distance radio communication area E in this case.

When the cellular phone terminal 10 and the key terminal 50 are a constant distance (5 m, for example) or more away from each other due to loss, theft, etc. of the cellular phone terminal 10, that is, when the cellular phone terminal 10 moves out of the short distance radio communication area E, a short distance radio communication between them is made impossible (outside the range). In response to such a change from inside the range to outside the range, the state of the mobile terminal 10 shifts from a normal state in which all the keys operations are possible to a restricted state in which a part or all of the key operation is restricted.

Figure 2:
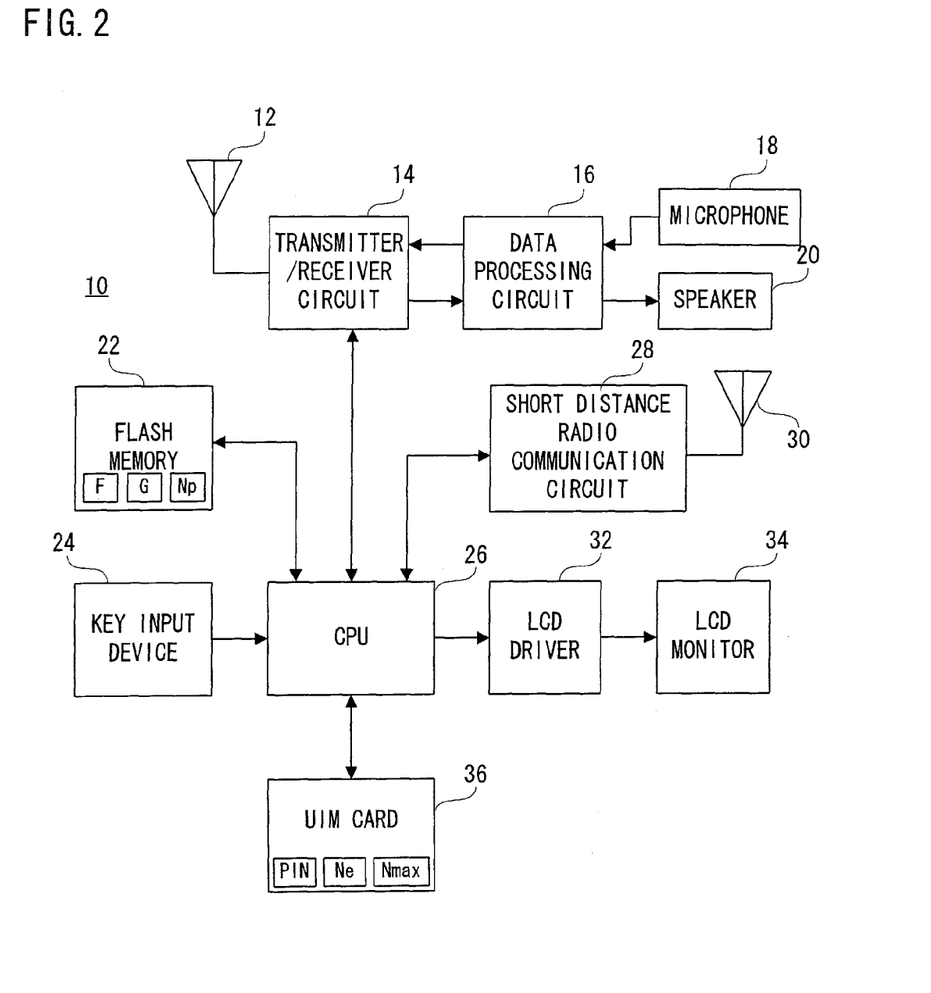
FIG. 2 is a block diagram showing a configuration of a cellular phone terminal applied to FIG. 1 embodiment.

First, in the normal state, a next processing is performed, for example. Referring to FIG. 2, the cellular phone terminal 10 includes a key input device 24. When a call-out operation is performed by the key input device 24, the CPU 26 outputs a call-out signal by controlling a transmitter/receiver circuit 14 and a data processing circuit 16. The output call-out signal is emitted from the antenna 12, and sent to a telephone of an intended party through a mobile communication network. When the intended party performs a call-in operation, conversation processing is started.

On the other hand, when a call-out signal from the intended party is received by the antenna 12, the transmitter/receiver circuit 14 notifies an incoming call to the CPU 26. The CPU 26 displays calling source information described in the incoming call notification on an LCD monitor 34 by controlling an LCD driver 32, and outputs an incoming call tone from a speaker 20 by controlling the transmitter/receiver circuit 14 and the data processing circuit 16. When a call-in operation is performed by the key input device 24, conversation processing is started.

The conversation processing is specifically executed below. A modulated audio signal (high frequency signal) sent from the intended party is received by the antenna 12, and the received modulated audio signal is subjected to demodulation processing by the transmitter/receiver circuit 14. The demodulated audio signal is subjected to DA conversion processing by the data processing circuit 16 so as to be converted into a received-audio-signal being an analog signal. The converted received-audio-signal is input to the speaker 20, and the speaker 20 outputs a received voice.

An audio-signal-to-be-transmitted captured by the microphone 18 is subjected to an AD conversion processing by the data processing circuit 16 so as to be converted into audio-data-to-be-transmitted being a digital signal. The converted audio-data-to-be-transmitted is subjected to modulation processing by the transmitter/receiver circuit 14 to thereby generate a modulated audio signal. The generated modulated audio signal is sent to the intended party by means of the antenna 12 like the above description.

When a conversation process ending operation is performed by the key input device 24, or when a conversation process ending operation is performed by the intended party, the conversation processing is ended.

Next, a restricted state includes a first restricted state for restricting a key operation except for a PIN code input operation and a second restricted state for restricting a key operation including a PIN code input operation. Since in each of the first and second restricted states, both of the call-out operation and the call-in operation are inhibited, it is impossible to perform a communication.

When a short distance radio communication with the key terminal 50 is outside the range, the state of the cellular phone terminal 10 shifts from the normal state to the first restricted state. In the first restricted state, following processing is executed.

The cellular phone terminal 10 includes an UIM (User Identity Module) card 36. The UIM card 36 is stored with a PIN code of a qualified person. This is called a "preset PIN code". When a PIN code inputting operation is performed by the key input device 24 in the first restricted state, the CPU 26 determines whether or not an input PIN code matches with the preset PIN code. If it is determined that the codes match with each other, the state of the cellular phone terminal 10 is restored to the normal state from the first restricted state.

Alternatively, when it is determined that the codes do not match with each other, the first restricted state is maintained. Thus, it is possible to execute a PIN code inputting operation again. It should be noted that limits are imposed on the number of continuous executions of the PIN code inputting operation. When the determination result still shows that the codes do not match with each other even after the number of continuous executions (Ne) has reached an upper limit of the number of executions (Nmax: three times, for example), the state of the cellular phone terminal 10 shifts from the first restricted state to the second restricted state. In the second restricted state, all the key operations including a PIN code inputting operation is inhibited, that is, the CPU 26 does not accept any key operation.

It should be noted that each of the number of continuous executions Ne and the upper limit of the number of executions Nmax is stored in the UIM card 36 together with the preset PIN code. The number of continuous executions Ne is a variable which is "0" at an initial value, and is rewritten according to a PIN code inputting operation, but each of the upper limit of the number of executions Nmax and the preset PIN code is invariant.

The CPU 26 controls a threshold value in association with the number of continuous executions Ne depending on a state of a short distance radio communication (hereinafter, simply referred to as "communication state") with the key terminal 50. More specifically, when the communication state is inside the range, the threshold value becomes the upper limit of the number of executions Nmax, and when the communication state is outside the range, the threshold value becomes the number of times (Mmax−Np) obtained by subtracting a preset number of times (Np: once, for example) from the upper limit of the number of executions Nmax. Thus, the timing shifting from the first restricted state to the second restricted state is at a time when Ne=3 inside the range and at a time when Ne=2 outside the range, for example.

On the other hand, the cellular phone terminal 10 enters from outside the range to inside the range, the threshold value (hereinafter, simply referred to as "threshold value") relating to the number of continuous executions Ne returns to Nmax from "Nmax−Np". Thus, the cellular phone terminal 10 which is Ne=2 outside the range and in the second restricted state, for example, returns to the first restricted state by entering inside the range, and can allow another PIN code inputting operation.

The control processing in a case that a qualified person loses the cellular phone terminal 10 is specifically explained as below. The key terminal 50 moves together with the qualified person to make a constant distance away or more between the key terminal 50 and the cellular phone terminal 10, the communication state changes from inside the range to outside the range. In response thereto, the state of the cellular phone terminal 10 shifts from the normal state to the first restricted state, and the threshold value becomes "Nmax−Np", that is, twice.

Then, assuming that the cellular phone terminal 10 is founded by an unqualified person, and the unqualified person executes a PIN code inputting operation. The possibility of accidentally matching the input code with the preset code is low, and therefore, the cellular phone terminal 10 shifts from the first restricted state to the second restricted state at a time when the number of continuous executions Ne reaches twice.

Assuming that the cellular phone terminal 10 which does not allow a key operation is discarded by the unqualified person, and is returned to the qualified person. In response to the communication state shifting from outside the range to inside the range, the threshold value increases to Nmax, that is, the three times, and the state of the cellular phone terminal 10 shifts from the second restricted state to the first restricted state. Thus, the qualified person can perform a PIN code inputting operation further Np times, that is, once more.

When the input code matches with the preset code here, the state of the cellular phone terminal 10 shifts from the first restricted state to the normal state in which a key operation is allowed. Alternatively, if the third input code does not match with the preset code, it is impossible to get out of the second restricted state.

Figure 4:
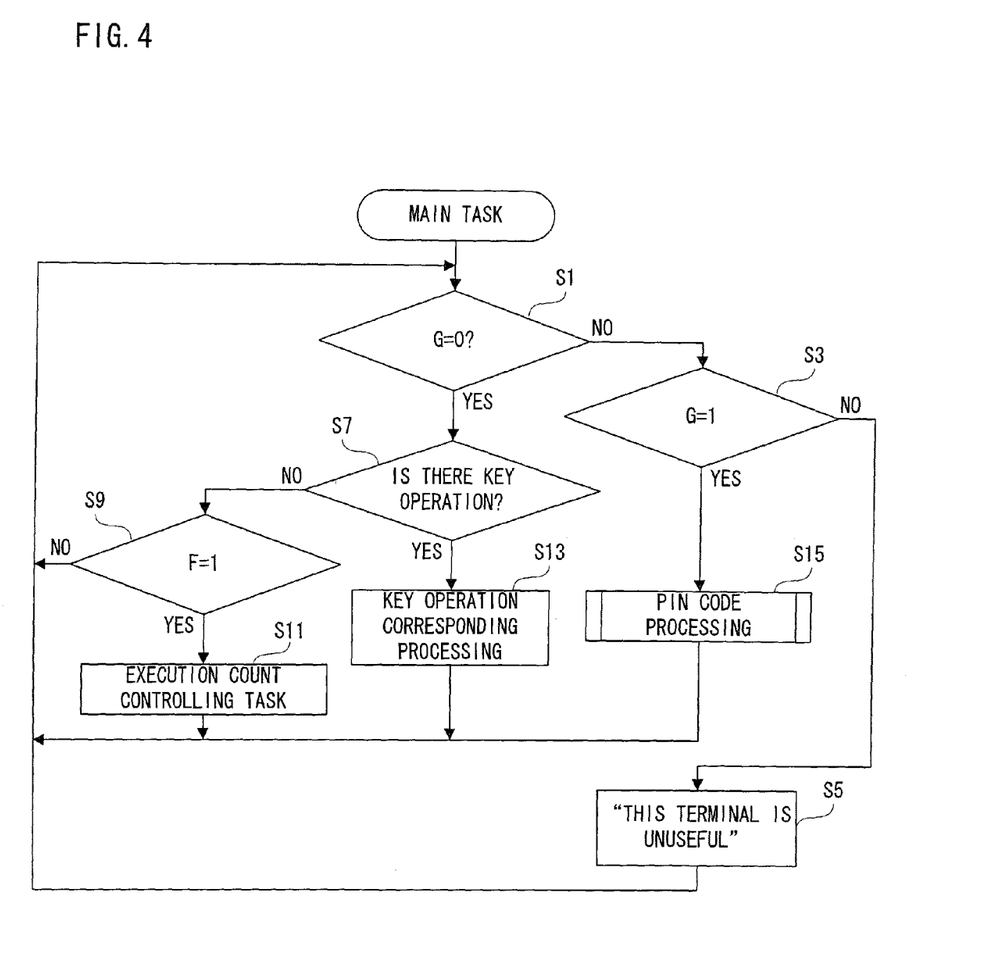
FIG. 4 is a flowchart showing a part of an operation of a CPU of a cellular phone terminal.
Figure 5:
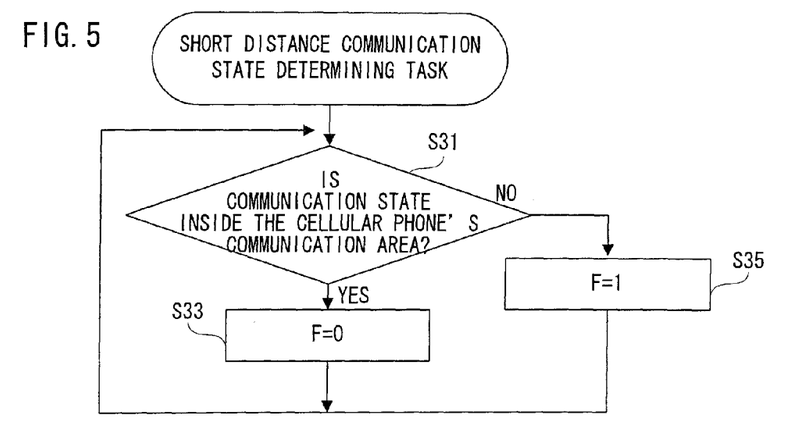
FIG. 5 is a flowchart showing another part of the operation of the CPU of the cellular phone terminal.
Figure 6:
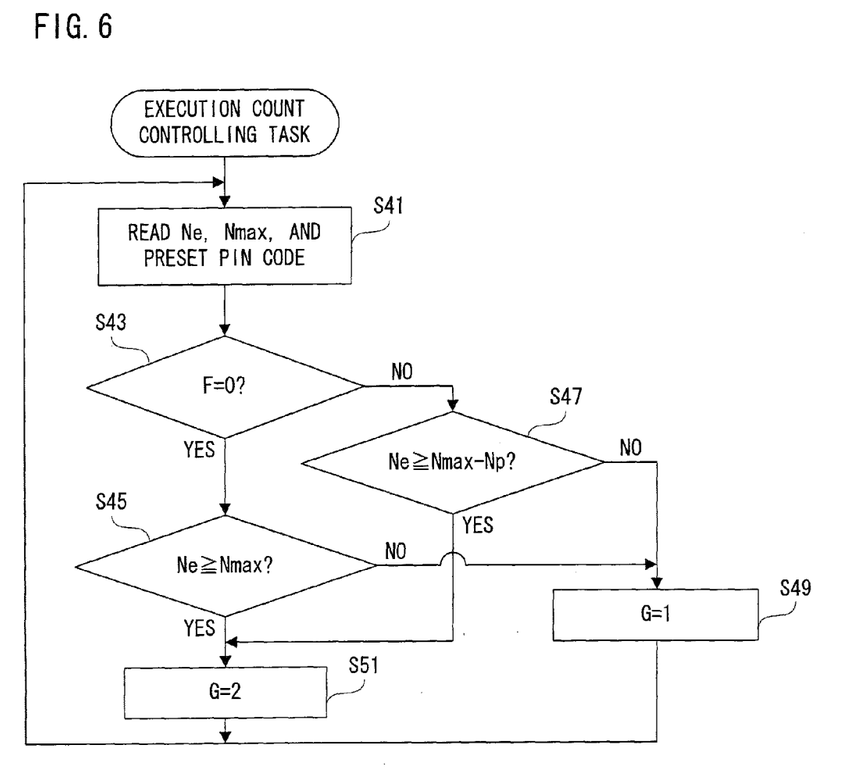
FIG. 6 is a flowchart showing a still another part of the operation of the CPU of the cellular phone terminal.
Figure 7:
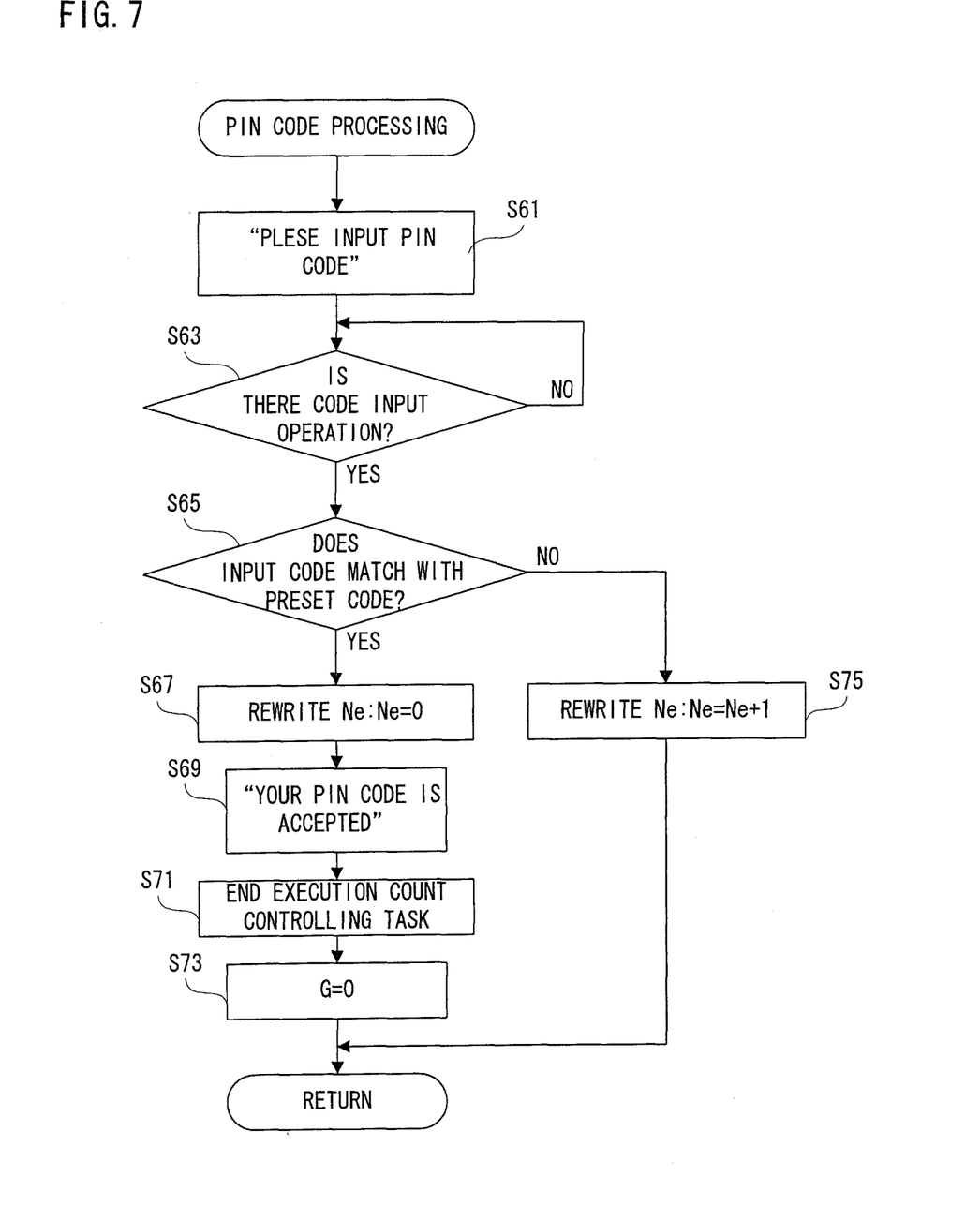
FIG. 7 is a flowchart showing a further part of the operation of the CPU of the cellular phone terminal.

The CPU 26 executes a main task shown in FIG. 4 and FIG. 7, a short distance radio communication state determining task shown in FIG. 5, and an execution count controlling task shown in FIG. 6. Each of the main task and the short distance radio communication state determining task is activated in response to a power source being turned on, and ended in response to the power source being turned off. The execution count controlling task is activated and ended by the main task. It should be noted that the CPU 26 is under a control of a multitasking OS such as μITRON, and can execute a plurality of tasks in parallel. Furthermore, a control program corresponding to these flowcharts is stored in the flash memory 22.

Referring to FIG. 4, in a step S1, it is determined whether or not a variable G is "0", and in a step S3, it is determined whether or not the variable G is "1". Here, the variable G is stored in the flash memory 22, and takes any one of values of "0", "1" and "2". The "G=0" corresponds to the normal state, the "G=1" corresponds to the first restricted state, and the "G=2" corresponds to the second restricted state.

If "NO" in each of the steps S1 and S3, a screen on which "this terminal is unuseful" is described is displayed on the LCD monitor 34 through the LCD driver 32 in a step S5. Then, the process returns to the step S1. Thus, in the second restricted state, loop processing of the steps S1, S3 and S5 is executed, and all the key operations including the PIN code inputting operation are inhibited.

If "YES" is determined in the step S3, PIN code processing (described later) is executed in a step S15, and then, the process returns to the step S1.

If "YES" is determined in the step S1, it is determined whether or not there is a key operation in a step S7. If "NO" here, it is determined whether or not a variable F is "1" in a step S9, and if "NO" also here, the process returns to the step S1. Here, the variable F is stored in the flash memory 22, and takes a value of any one of "0" and "1". The "F=0" corresponds to inside the range, and the "F=1" corresponds to outside the range. Thus, in the normal state, through loop processing of the steps S1, S7 and S9, each of the presence or absence of a key operation and the presence or absence of the change from inside the range to outside the range is monitored.

If "YES" is determined in the step S7, the process shifts to a step S13 to execute processing according to the key operation, such as conversation processing, for example, and then, the process returns to the step S1. If "YES" is determined in the step S9, the process returns to the step S1 after the execution count controlling task is activated in a step S11.

Referring to FIG. 5, in a step S31, it is determined whether or not a communication state of the short distance radio communication circuit 28 is inside the range. If "YES" is determined here, "0" is set to the variable F in a step S33, and if "NO", "1" is set to the variable F in a step S35. After setting, the process returns to the step S31.

Referring to FIG. 6, in a step S41, each of a variable Ne, an upper limit of the number of executions Nmax (=3) and a preset PIN code are read from the UIM card 36. In a step S43, it is determined whether or not the variable F is "0", and if "YES" is determined here, it is further determined whether or not the variable Ne reaches the upper limit of the number of executions Nmax in a step S45. If "NO" in the step S43, it is determined whether or not the variable Ne reaches the number of times (=2) obtained by subtracting a preset number of times Np (=1) from the upper limit of the number of executions Nmax in a step S47. Here, the preset number of times Np is stored in the flash memory 22.

If "NO" in the step S45 or S47, "1" is set to the variable G in a step S49, and if "YES" in the step S45 or S47, "2" is set to the variable G in a step S51. After setting, the process returns to the step S41.

The PIN code processing in the above-described step S17 is according to a subroutine shown in FIG. 7. Referring to FIG. 7, in a step S61, a screen on which "Please input a PIN code" is described is displayed on the LCD monitor 34. In a step S63, it is determined whether or not there is a code inputting operation, and if "NO", a stand-by condition prevails. When a code inputting operation is performed by the key input device 24, "YES" is determined in the step S63, and the process shifts to a step S65.

In the step S65, it is determined whether or not the input code matches with the preset PIN code. If "YES" is determined here, the process is restored to the routine at the hierarchical upper level through a series of processing in steps S67-S73, and if "NO", the process is restored to the routine at the hierarchical upper level through the processing in a step S75.

In the step S67, the UIM card 36 is requested to rewrite the variable Ne to "0". A CPU (not illustrated) of the UIM card 36 rewrites the variable Ne to "0" in response to the request. In the step S69, a screen on which "Your PIN code is accepted" is described is displayed. In the step S71, the execution count controlling task is ended. In the step S73, "0" is set to the variable G. In the step S75, the UIM card 36 is requested to rewrite the variable Ne to "Ne+1". The CPU of the UIM card 36 updates the variable Ne into "Ne+1".

Accordingly, when the communication state shifts from inside the range to outside the range due to loss of the cellular phone terminal 10, the determination result in the step S31 changes from "YES" to "NO". In response thereto, the execution count controlling task is activated in the step S11. The activated execution count controlling task remains in an activated state until it is determined that both of the codes match with each other in the step S65.

In the execution count controlling task, the communication state is outside the range, and therefore, the determination processing in the step S47 is executed. Since the threshold value in the step S47 is "Nmax−Np", that is, "2", but Ne=0, the determination result is "NO", resulting in G=1. In response thereto, in the main task, processing in the step S17, that is, PIN code processing (see FIG. 7) is executed. When a first PIN code inputting operation is performed by an unqualified person, it is determined that the codes do not match with each other, and the variable Ne is incremented.

Since the determination result in the step S47 is not changed even after Ne=1, and therefore, the PIN code processing is executed in the main task. In a second PIN code inputting operation also, it is determined that the codes do not match with each other, so that the variable Ne is incremented.

When Ne=2, the determination result in the step S47 is updated from "NO" to "YES", resulting in G=2. In response thereto, in the main task, the processing in the step S19 is executed to display a message that "This terminal is unuseful" on the monitor screen.

Thereafter, when the cellular phone terminal 10 is returned to the qualified person, the communication state shifts from outside the range to inside the range, and in the execution count controlling task, the determination processing in the step S45 is executed in place of that in the step S47. Since the variable Ne remains "2", but the threshold value is "Nmax", that is, "3" in the step S45, the determination result is "NO", resulting in G=1. In the main task, PIN code processing is executed. When a third code inputting operation is performed by the qualified person here, it is determined that the codes match with each other, resulting in G=0. Thus, in the main task, loop processing of the steps S3, S9 and S11 is restarted to allow a key operation.

As understood from the above description, in this embodiment, the CPU 26 of the cellular phone terminal 10 shifts between a first restricted state in which a key operation except for a PIN code input operation is restricted, a second restricted state in which a key operation including a PIN code input operation is restricted, and an unrestricted state in which a key operation is not restricted. Specifically, when a PIN code input by a PIN code inputting operation in the first restricted state is a preset PIN code, the unrestricted state is selected (S73). Furthermore, it is repetitively determined whether or not the number of executions of the PIN code inputting operation in the first restricted state is above a threshold value. If the determination result is negative, the first restricted state is selected while if the determination result is affirmative, the second restricted state is selected (S49, S51). Then, when the communication state between the short distance radio communication circuit 28 and the key terminal 50 is inside the range, the threshold value is made large, and when it is outside the range, the threshold value is made smaller (S43).

Thus, when the number of executions of the PIN code inputting operation in the first restricted state is above the threshold value, the second restricted state is established, and therefore, the PIN code inputting operation can be allowed by the number corresponding to the threshold value. Here, the threshold value is made larger when the communication state is inside the range, and the threshold value is made smaller when the communication state is outside the range. When the threshold value is increased to thereby make the number of executions of PIN code inputting operations smaller than the threshold value, the first restricted state is established. Thus, when the communication state shifts from outside the range to inside the range, that is, when the cellular phone terminal 10 held by the unqualified person is returned to the qualified person, a further PIN code inputting operation is allowed by the number of times corresponding to the difference (Np) of the threshold values. Thus, it is possible to make it difficult for the unqualified person to remove the restriction, and make it easy for the qualified person to remove the restriction.

Additionally, when the communication state is updated from inside the range to outside the range in this embodiment, the first restricted state is selected in place of the normal state, but the selecting processing may be executed by making a control signal from an external device as a trigger.

Furthermore, in this embodiment, when the communication state is inside the range, the threshold value is made larger, and when the communication state is outside the range, the threshold value is made smaller. In general, the higher the probability of the key operator being a qualified person is, the lager the threshold value is made, and whereby, it is possible to make it difficult for the unqualified person to remove the restriction, and make it easy for the qualified person to remove the restriction.

In addition, in this embodiment, the key operation does not include an operation of turning on and off the power source, that is, in each of the first restricted state and the second restricted state, an operation of turning on and off the power source can be made. Alternatively, in the first restricted state, an operation of turning on and off the power source may be performed while in the second restricted state, an operation of turning on and off the power source may not be performed. In addition, in the second restricted state, a specific operation such as a call-in operation may be performed in addition to an operation of turning on and off the power source. Thus, in the first restricted state, a key operation except for at least a PIN code inputting operation is restricted, and in the second restricted state, a key operation including at least a PIN code inputting operation is restricted.

Figure 8:
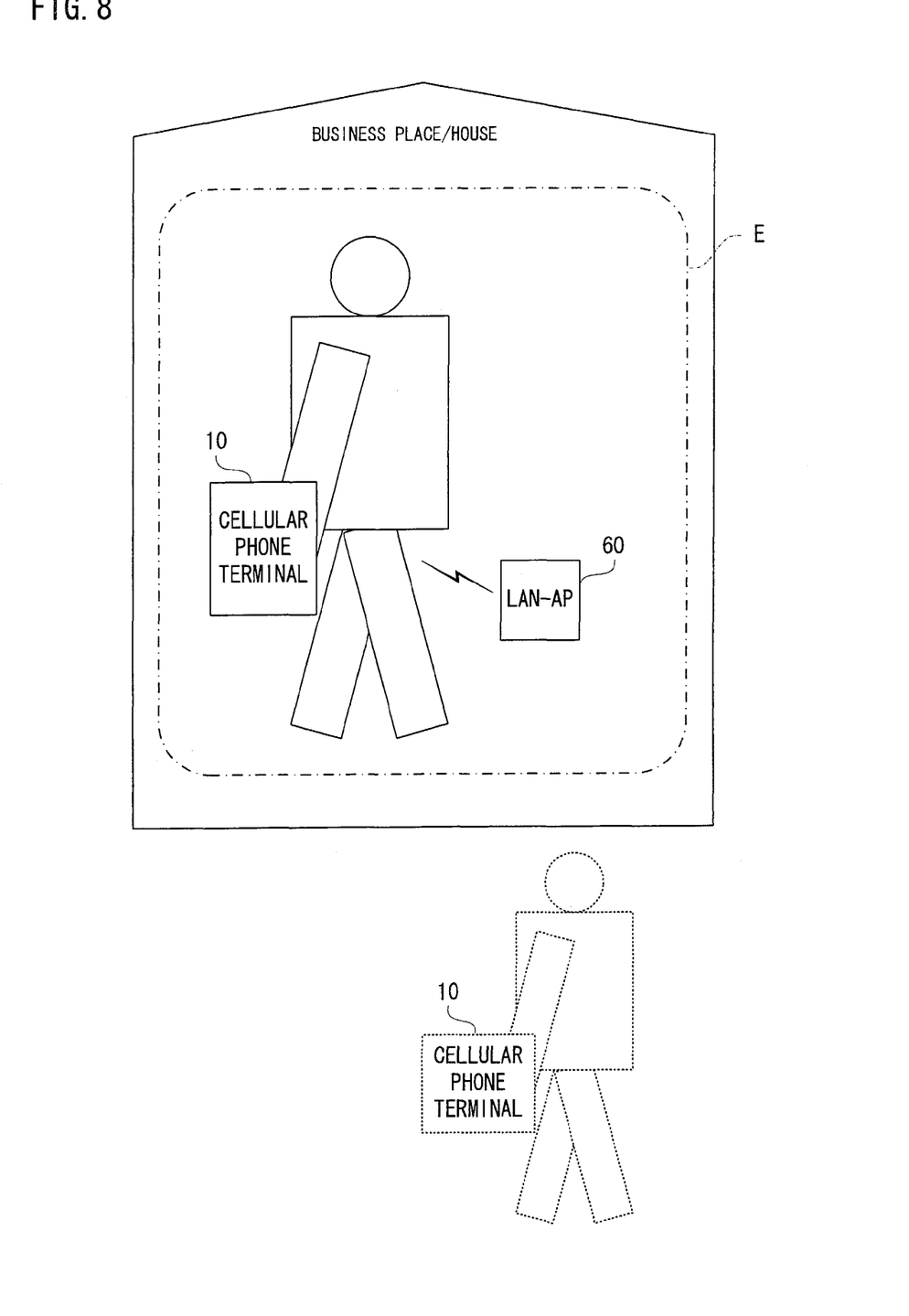
FIG. 8 is a block diagram showing another embodiment of the present invention.

Next, another embodiment of the present invention is explained with reference to FIG. 8. Referring to FIG. 8, a wireless LAN access point (LAN-AP) 60 is set indoors such as in a business place or a house. A cellular phone terminal 10 is held by a qualified person such as an employee of the business place and a dweller of the house, and constructed similar to the previous embodiment (see FIG. 2). However, the short distance radio communication circuit 28 performs a short distance radio communication with the LAN-AP 60 in place of the key terminal 50. Thus, a short distance radio communication area E is a communication allowable area with the LAN-AP 60, that is, indoor. The LAN-AP 60 includes components corresponding to the short distance radio communication circuit 54 and the CPU 56 (see FIG. 3). The CPU 26 executes processing similar to that in the previous embodiment (see FIG. 4-FIG. 7). The possibility of the operator of the cellular phone terminal 10 being a qualified person is determined on the basis of the communication state between the cellular phone terminal 10 and the LAN-AP 60.

In the foregoing, the cellular phone terminal 10 is explained as an example, but the present invention can be applied to a mobile terminal apparatus performing processing according to an key operation, such as a notebook computer, a PDA, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile terminal shifting a state between a restricted state for restricting a key operation and an unrestricted state for making a key operation unrestricted, comprising:
 a first selector for selecting said unrestricted state when a PIN code is input by a code inputting operation in a first restricted state for restricting a key operation so as to not perform a function associated with the key operation, excluding at least the code inputting operation;
 a second selector for determining whether a number of unsuccessful code inputting operations in said first restricted state is above a threshold value, selecting said first restricted state when it is determined that the number of unsuccessful code inputting operations is not above the threshold value, and selecting a second restricted state for restricting a key operation including at least the code inputting operation when it is determined that the number of unsuccessful code inputting operations is above the threshold value;
 a communicator for executing a short range radio communication with an external communication device; and
 a threshold changer for determining a possibility of a key operator being a qualified person and increasing said threshold value when said possibility is determined to be high, wherein said threshold changer determines that said possibility is high when said terminal itself is inside a predetermined area, and determines that said possibility is low when said terminal itself is outside said predetermined area.

2. A mobile terminal according to claim 1, further comprising
 a third selector for selecting said first restricted state when communication with said external communication device by said communicator cannot be established.

3. A mobile terminal according to claim 1, wherein a number of unsuccessful code inputting operations noted by said second selector is a consecutive number of unsuccessful code inputting operations performed by the key operator.

4. A mobile terminal according to claim 1, wherein each of said first restricted state and said second restricted state does not restrict turning on and off a power source of the mobile terminal.

5. A non-transitory recording medium storing a control program of a mobile terminal shifting a state between a restricted state for restricting a key operation and an unrestricted state for making a key operation unrestricted, wherein
 said control program causes a processor of said mobile terminal to execute
 a first selecting step for selecting said unrestricted state when a PIN code is input by a code inputting operation in a first restricted state for restricting a key operation so as to not perform a function associated with the key operation, excluding at least the code inputting operation;
 a second selecting step for determining whether a number of unsuccessful code inputting operations in said first restricted state is above a threshold value, selecting said first restricted state when it is determined that the number of unsuccessful code inputting operations is not above the threshold value, and selecting a second restricted state for restricting a key operation including at least the code inputting operation when it is determined that the number of unsuccessful code inputting operations is above the threshold value;
 a communication step for executing a short range radio communication with an external communication device; and
 a threshold changing step for determining a possibility of a key operator being a qualified person and increasing said threshold value when said possibility is determined to be high, wherein said threshold changer determines that said possibility is high when said terminal itself is inside a predetermined area, and determines that said possibility is low when said terminal itself is outside said predetermined area.

6. A controlling method of a mobile terminal shifting a state between a restricted state for restricting a key operation and an unrestricted state for making a key operation unrestricted, comprising:
 a first selecting step for selecting said unrestricted state when a PIN code is input by a code inputting operation in a first restricted state for restricting a key operation so as to not perform a function associated with the key operation, excluding at least the code inputting operation;
 a second selecting step for determining whether a number of unsuccessful code inputting operations in said first restricted state is above a threshold value, selecting said first restricted state when it is determined that the number of unsuccessful code inputting operations is not above the threshold value, and selecting a second restricted state for restricting a key operation including at least the code inputting operation when it is determined that the number of unsuccessful code inputting operations is above the threshold value;
 a communication step for executing a short range radio communication with an external communication device; and
 a threshold changing step for determining a possibility of a key operator being a qualified person and increasing said threshold value when said possibility is determined to be high, wherein said threshold changer determines that said possibility is high when said terminal itself is inside a predetermined area, and determines that said possibility is low when said terminal itself is outside said predetermined area.

7. The non-transitory recording medium according to claim 5, wherein said control program causes a processor of said mobile terminal to further execute a third selecting step for selecting said first restricted state when communication with said external communication device by said communicator cannot be established.

8. The non-transitory recording medium according to claim 5, wherein a number of unsuccessful code inputting operations noted by said second selector is a consecutive number of unsuccessful code inputting operations performed by the key operator.

9. The non-transitory recording medium according to claim 5, wherein each of said first restricted state and said second restricted state does not restrict turning on and off a power source of the mobile terminal.

10. The method according to claim 6, further comprising a third selecting step for selecting said first restricted state when communication with said external communication device by said communicator cannot be established.

11. The method according to claim 6, wherein a number of unsuccessful code inputting operations noted by said second selector is a consecutive number of unsuccessful code inputting operations performed by the key operator.

12. The method according to claim 6, wherein each of said first restricted state and said second restricted state does not restrict turning on and off a power source of the mobile terminal.

* * * * *